Figure 1:
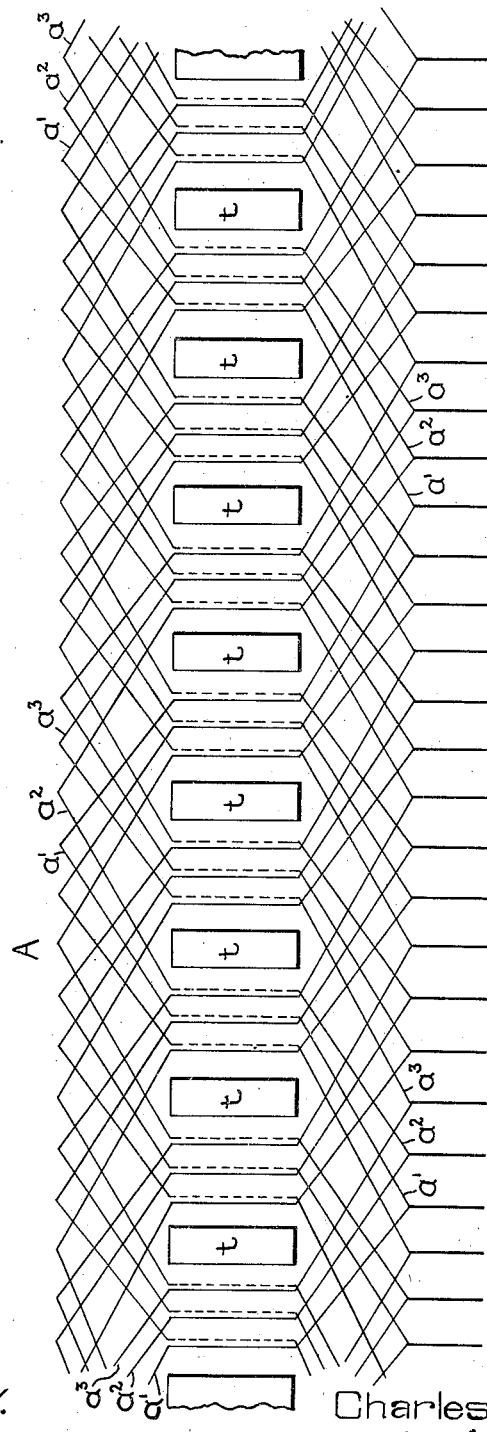

No. 820,997. PATENTED MAY 22, 1906.
C. P. STEINMETZ.
ARMATURE WINDING.
APPLICATION FILED OCT. 10, 1904.

2 SHEETS—SHEET 1.

WITNESSES:
INVENTOR:
Charles P. Steinmetz.
by Albert G. Davis
Att'y.

No. 820,997. PATENTED MAY 22, 1906.
C. P. STEINMETZ.
ARMATURE WINDING.
APPLICATION FILED OCT. 10, 1904.

2 SHEETS—SHEET 2.

WITNESSES:

INVENTOR:
Charles P. Steinmetz.
by Albert G. Davis Atty.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ARMATURE-WINDING.

No. 820,997. Specification of Letters Patent. Patented May 22, 1906.

Application filed October 10, 1904. Serial No. 227,830.

*To all whom it may concern:*

Be it known that I, CHARLES P. STEINMETZ, a citizen of the United States, residing at Schenectady, in the county of Schenectady and State of New York, have invented certain new and useful Improvements in Armature-Windings, of which the following is a specification.

My invention relates to dynamo-electric machines; and its object is to provide a novel armature-winding by means of which a given number of coils may be placed in a number of slots equal to only a fraction of the coil number and nevertheless produce an even progression of the phase of the induced voltages in the coils around the armature. It sometimes happens that it is desirable to use so great a number of coils in an armature-winding that it is impracticable to arrange the armature-core with as many slots as there are coils. If, however, two or more coils are placed with their corresponding sides in the same slots, it is evident that the phase of the voltages induced in those coils and appearing at the commutator-segments to which they are connected will be the same, so that as far as commutation is concerned the effect is the same as if the commutator-brush were being continuously moved back and forth over a range of a number of commutator-segments corresponding to the number of coils per slot instead of being fixed in position with reference to the magnetic field, as it should be for most successful commutation and as is practically the case in armature-windings having not more than one coil per slot in which the phase of the induced voltages in adjacent coils progresses regularly around the armature.

When only two coils have their corresponding sides in the same slot, it is obviously a simple matter to increase or decrease the width of one coil by the distance between adjacent slots, so that the other sides of the two coils do not lie in the same slot, but in neighboring slots. By this simple expedient a difference in the phase of the induced voltages in the two coils is obtained, and by similarly arranging each pair of coils around the armature a regular progression of the phase of the induced voltages in all the coils is obtained. When the number of coils is more than two times the number of slots, the problem becomes more complicated.

My invention consists in providing a novel form of winding which is applicable to an armature having more than two coils per slot and arranged to give a regular progression of the phase of the induced voltages in the several coils around the armature. Specifically considered, my invention consists in giving to each coil a pitch or width equal to the distance between adjacent slots multiplied by a whole number and a fraction. Thus with a winding in which there are three coils per slot the first conductor in one slot is connected to form a coil with the second or third conductor in another slot, according as the pitch of the coil is chosen as $n + \frac{1}{3}$ or $n + \frac{2}{3}$.

My invention will best be understoood by reference to the accompanying drawings, in which—

Figure 2:
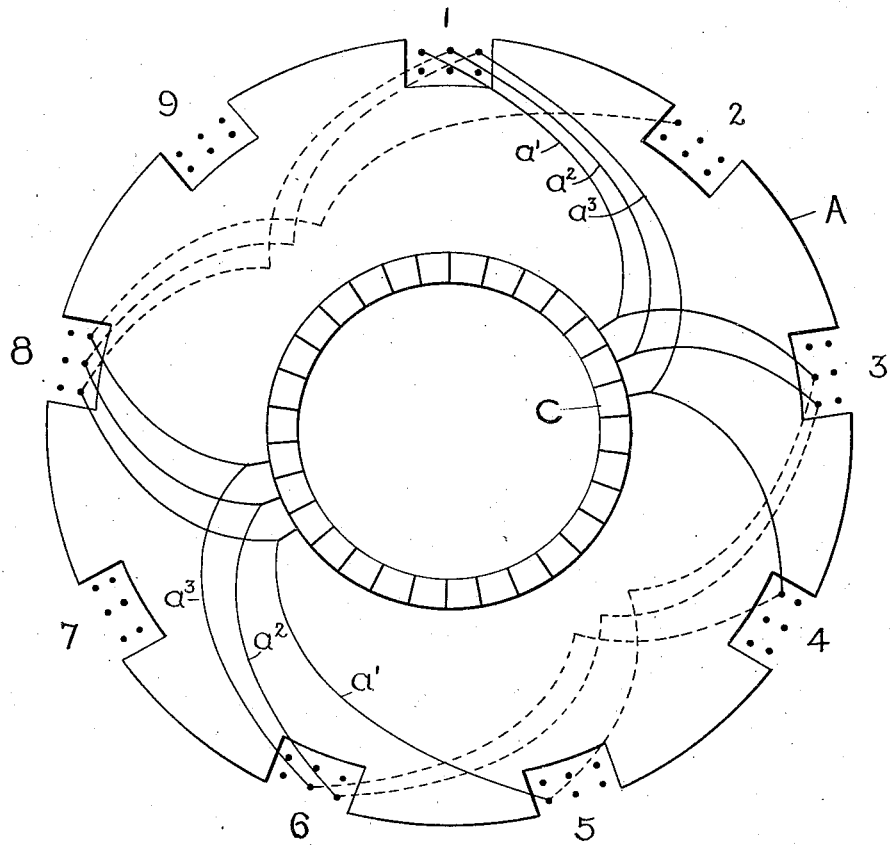

Figure 1 shows a development on a plane surface of a three-coil-per-slot wave-winding arranged in accordance with my invention, and Fig. 2 shows diagrammatically an end view of the armature showing three complete turns of the winding shown in Fig. 1.

Referring first to Fig. 2, A represents the armature provided with nine slots, (indicated by the numbers 1 to 9.) For the sake of simplicity a small number of slots has been chosen. C represents the commutator, which is provided with twenty-seven segments. Three complete turns of a wave-winding are shown, the three turns being indicated by the reference-letters $a'$, $a^2$, and $a^3$. It will be noticed that the turn $a'$ starts with what may be called the "first upper conductor" in slot 1 and passes across the front of the armature and to what may be called the "second lower conductor" in slot 3—that is, the distance between adjacent coils is two and one-third slots. From the middle lower conductor of coil 3 this first turn $a'$ passes across the back end of the armature to the third upper conductor in slot 5, the coil width being, like the distance between coils, equal to two and one-third slots. From the third upper conductor of slot 5 the turn passes across the front of the armature to the first lower conductor of coil 8, thus skipping two slots instead of one. From the first lower conductor of slot 8 it passes to the second upper conductor of slot 1 and there enters upon its second turn around the armature, as indicated by $a^2$. By tracing out this turn it will be seen that it ends at the third upper conductor of slot 1, there becoming the third complete turn, as indicated by $a^3$, which turn ends at the first upper conductor of slot 2. The pitch in each case is two and one-third slots. It will be seen that each complete turn progresses by one conductor around the armature. Furthermore, while the three turns $a'$, $a^2$, and $a^3$ are together in slot 1 only two of them, $a'$ and $a^2$, are together in slot 3, and those two then separate, one going to slot 5 and the other to slot 6, the latter again rejoining the turn $a^3$. A regular progression of the phase of the induced voltages in the several coils around the armature is secured with this arrangement.

A complete development of the winding, which has been already described, is shown in Fig. 1, the teeth separating the slots being indicated by $t$, and three complete turns are indicated by the same reference-letters, as in Fig. 2.

Obviously instead of making the coil pitch one-third greater than a whole number of slots, it may be made one-third less, or, in other words, the pitch may be either $n + \frac{1}{3}$ or $n + \frac{2}{3}$, where $n$ is a whole number of slots. Furthermore, the same principle is applicable to windings having more than three coils per slot, the coil pitch in each case being equal to a whole number of slots plus a fraction, the denominator of which is equal to the number of coils per slot. This last statement may be expressed mathematically in its most general form by saying that the pitch equals $(n + \frac{n'}{x})$ slots, $n$ and $n'$ being whole numbers and $x$ being the number of coils per slot at the surface of the armature. In practice the pitch will generally be chosen so that each coil differs from the whole number of slots by the width of a single coil, so that the above expression would become $(n \pm \frac{1}{x})$ slots.

In the phrase "the pitch is $(n \pm \frac{1}{x})$ slots" it must be noted that the words are to be understood in their usual technical sense, not as an exact statement of the physical width of the coil. Thus just as the statement that "the pitch of a coil is ten slots" is understood in the art to mean simply that the coil has one side in a slot ten slots distant from the other side, and not as meaning that the coil width is exactly ten times the slot width—which would be untrue, as the statement takes no account of width of teeth—so a pitch of $(n + \frac{1}{x})$ slots means simply that one side of a coil is in a slot $n$ slots distant from the slot containing the other side of the coil and that the two sides of the coil do not occupy the same relative position in the two slots, but are displaced relatively by a coil width, $x$ being the number of coils in a slot.

Although for the sake of simplicity I have illustrated and described my invention as applied to a winding having only one turn per coil, it is obvious that my invention is applicable to a winding composed of coils having any number of turns. Consequently I do not desire to limit myself to the particular construction and arrangement shown, but aim in the appended claims to cover all modifications which are within the scope of my invention.

What I claim as new, and desire to secure by Letters Patent of the United States, is—

1. In a dynamo-electric machine, an armature-winding having a plurality of coils per slot and a coil width equal to the distance between adjacent slots multiplied by a whole number plus a fraction.

2. In a dynamo-electric machine, an armature-winding having a plurality of coils per slot and a coil pitch equal to a fractional number of slots.

3. In a dynamo-electric machine, an armature-winding having a plurality of coils per slot and a coil pitch equal to $(n \pm \frac{1}{x})$ slots, $n$ being a whole number and $x$ being the number of coils per slot.

4. In a dynamo-electric machine, an armature-winding having three coils per slot and a coil pitch equal to $(n \pm \frac{1}{3})$ slots, $n$ being a whole number.

5. In a dynamo-electric machine, an armature-winding having three coils per slot and a coil width equal to the distance between adjacent slots multiplied by a whole number plus or minus one-third.

6. In a dynamo-electric machine, an armature-winding having a plurality of coils per slot and a coil width equal to the distance between adjacent slots multiplied by a whole number plus a fraction having as its denominator the number of coils per slot.

7. In a dynamo-electric machine, a slotted armature-core, a commutator carried thereby, three or more independent windings distributed in the slots of said core, each slot containing coils belonging to each of said windings, and leads from said coils to successive commutator-segments, said coils being so arranged in said slots that the phase of the induced voltage of each lead corresponds to the angular position of the commutator-segment to which it is connected.

In witness whereof I have hereunto set my hand this 7th day of October, 1904.

CHARLES P. STEINMETZ.

Witnesses:
EDWARD WILLIAMS, Jr.,
HELEN ORFORD.